United States Patent
Takayama et al.

[11] Patent Number: 5,315,640
[45] Date of Patent: May 24, 1994

[54] DATA TRANSFER DEVICE

[75] Inventors: Akira Takayama, Hamamatsu; Mitsuo Yoshida, Tokyo; Shinichi Matsui, Gifu, all of Japan

[73] Assignees: Yamaha Corporation; Nippon Telegraph and Telephone Corporation, Japan

[21] Appl. No.: 693,625

[22] Filed: Apr. 30, 1991

[30] Foreign Application Priority Data

Oct. 31, 1990 [JP] Japan .................. 2-293804

[51] Int. Cl.⁵ .................. H04M 11/00; H04M 1/00
[52] U.S. Cl. .................. 379/93; 379/100; 379/355; 379/356
[58] Field of Search .............. 379/93, 94, 96, 97, 379/98, 100, 142, 387, 355, 356; 358/400, 434, 435, 436, 439, 440

[56] References Cited

U.S. PATENT DOCUMENTS

| | | | |
|---|---|---|---|
| 4,353,097 | 10/1982 | Takeda et al. | 379/100 |
| 4,443,664 | 4/1984 | Gange | 379/142 |
| 4,837,812 | 6/1989 | Takahashi et al. | 379/93 |
| 4,928,305 | 5/1990 | Yui | 379/93 |
| 5,001,572 | 3/1991 | Hashimoto et al. | 379/100 |
| 5,014,299 | 5/1991 | Klupt et al. | 379/98 |
| 5,046,187 | 9/1991 | Takahashi | 379/100 |
| 5,101,427 | 3/1992 | Kotani et al. | 379/355 |
| 5,142,525 | 8/1992 | Nakatsuma | 379/93 |

Primary Examiner—Curtis Kuntz
Assistant Examiner—Jason Chan
Attorney, Agent, or Firm—Scully, Scott, Murphy & Presser

[57] ABSTRACT

A data transfer device is disclosed whereby both spoken conversation and transfer of data can easily and conveniently be carried out with a minimum of manual steps and repetitions operations. The disclosed device includes first telephone number memory for storing a telephone number of a remote communication node when the data transfer device originates a communication session; second telephone number memory for storing a telephone number of the remote communication node when the remote communication node originates the communication session; start command generating circuit for generating a start command; and data transfer circuit for transferring data. The above mentioned data transfer circuit is such that when the start command generating circuit generates a start command and the data transfer device has originated the communication session, the data transfer circuit initiates a connection over a channel for transmission of digital data between the data transfer device and the remote node corresponding to the telephone number stored in the first telephone number memory, and when the start command generating circuit generates a start command and the remote node has originated the communication session, the data transfer circuit Initiates a connection over a channel for transmission of digital data between the data transfer device and the remote node corresponding to the telephone number stored in the second telephone number memory.

2 Claims, 5 Drawing Sheets

DATA TRANSFER DEVICE

BACKGROUND OF THE INVENTION

1. Field of the Invention

The present invention relates to devices used for transfer of data over digital communication networks.

2. Prior Art

Data communication devices are conventionally known, through the use of which, both speech and data can be transmitted over digital communication lines. When such a conventional data communication device is employed, in order to establish a voice link with a remote station and then initiate transmission of digital data, the following operations are carried out by the individual operating the device:

a) the telephone number of the remote station is entered and a connection and voice link therewith is established;

b) disconnect after confirming that data is to be transferred; and c) reentering the telephone number of the communication destination or activating a re-dial function, and then initiating transfer of data after a data link has been established with the remote station.

On the other hand, facsimile devices having a conversation circuit and a modem (modulator and demodulator) are conventionally known, through the use of which, both speech and picture data can be transmitted. When an individual transmits picture data by using such a conventional facsimile device, the individual calls the desired remote station and communicates with the individual who operates the remote station, after which the individual in the local station depresses a communication start button, whereby the telephone line is automatically released from the conversation circuit and connected with the modem, and then the picture data is transmitted to the remote station via the telephone line.

With the above described types of conventional data transfer device, when it is desired to transmit data while a spoken conversation between a local and remote station, before the start button for transfer of data is pressed, the number of the destination station must be manually reentered or a re-dial function must be activated. For this reason, the number of manual steps is increased, as well as is the chance for operator error. Additionally, the spoken conversation is interrupted during transmission of data. Furthermore, when the station first called desires to initiate transfer of data to the remote station, the telephone number of the remote station must be looked up and manually entered, or an autodialer must be activated.

SUMMARY OF THE INVENTION

In consideration of the above, it is an object of the present invention to provide a data transfer device, whereby through the use of which, both spoken conversation and transfer of data can easily and conveniently be carried out with a minimum of manual steps and repetitious operations.

So as to achieve the above described object, the present invention provides a data transfer device comprising first telephone number memory means for storing a telephone number of a remote communication node when the data transfer device originates a communication session; second telephone number memory means for storing a telephone number of the remote communication node when the remote communication node originates the communication session; start command generating means for generating a start command; and data transfer means for transferring data. The above mentioned data transfer means operates such that when the start command generating means generates a start command and the data transfer device has originated the communication session, the data transfer means initiates a connection over a channel for transmission of digital data between the data transfer device and the remote node corresponding to the telephone number stored in the first telephone number memory means, and when the start command generating means generates a start command and the remote node has originated the communication session, the data transfer means initiates a connection over a channel for transmission of digital data between the data transfer device and the remote node corresponding to the telephone number stored in the second telephone number memory means.

DETAILED DESCRIPTION OF THE PREFERRED EMBODIMENTS

In the following, the preferred embodiments of the present invention will be described in detail with reference to the drawings.

Figure 1:
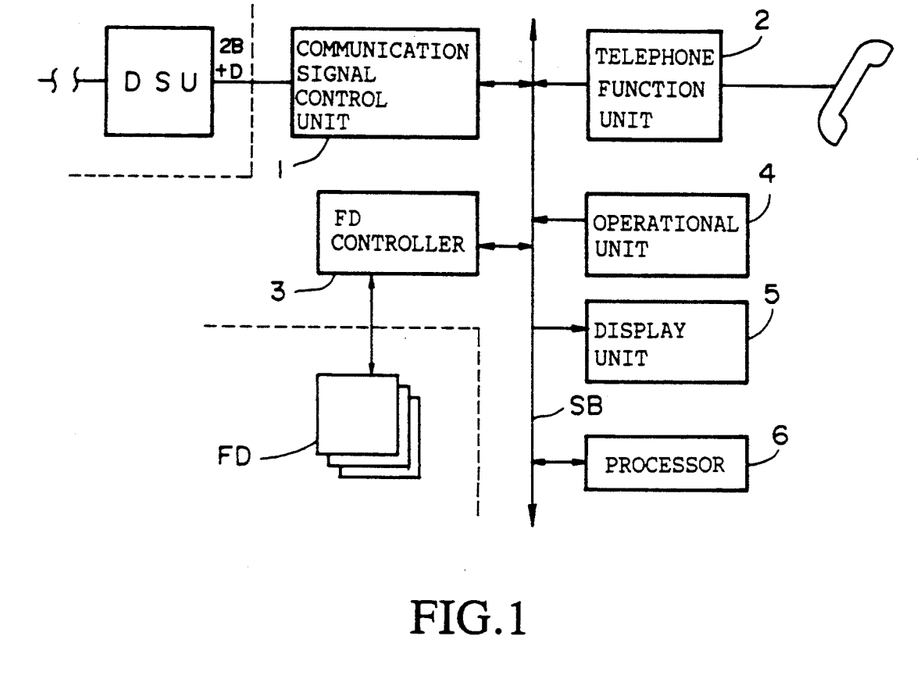
FIG. 1 is a block diagram showing the electrical layout of a data transfer device in accordance with a first preferred embodiment of the present invention.
Figure 2:
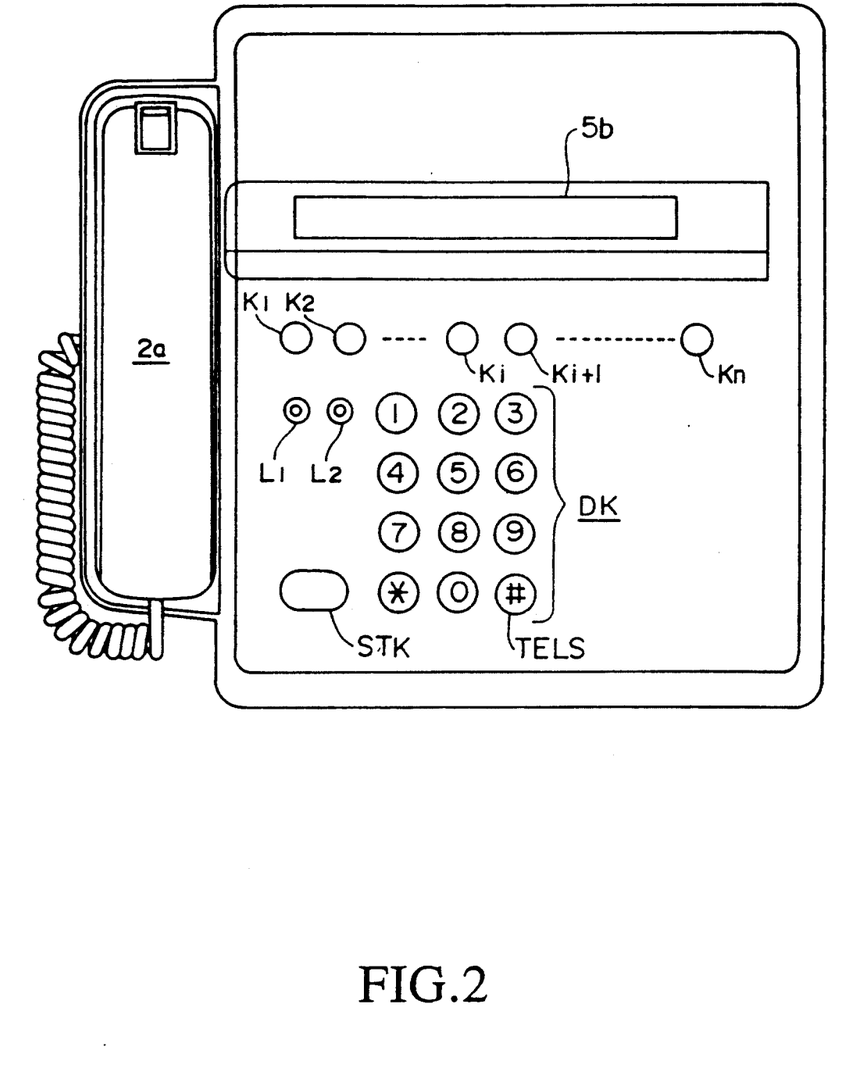
FIG. 2 is an overhead view showing the external appearance of the data transfer device shown in FIG. 1.

FIG. 1 is a block diagram showing the electrical layout of a data transfer device in accordance with a first preferred embodiment of the present invention, the external appearance of which from above can be seen in FIG. 2. The illustrated device is suitable for use as a terminal node on an ISDN (Integrated Services Digital Network), and includes standard telephone functions, as well as data communication functions for transmitting data stored on floppy disks and the like to remote sites on the ISDN and for receiving data transmitted from remote sites on the ISDN which can then be downloaded to a floppy disk. As shown in FIG. 2, the operating panel for this device includes function indicating switches in the form of buttons K1, K2 ... Ki, Ki+1, ... Kn−1, Kn. Also included is a numerical switch unit DK made up of number buttons [0] through [9] for inputting numerical data such as telephone numbers, along with a TELS button [#] and star button [*] which can be used for functions such as re-calling the last operating individual. Additionally included is a start button STK for initiation of uploading and transmission of data stored on a floppy disk in the local floppy disk drive. Two LED (light emitting diode) indicator lamps are provided, namely, FD ready lamp $L_1$ for indicating that preparation for data communication has been completed and that uploading of data from the local floppy disk drive can be initiated at will, and data transfer completed lamp $L_2$ for indicating that the transfer of data has been completed. A forty column by two row liquid crystal display LCD $5b$ is provided, by means of which, communication status and various other types of character format information can be displayed to the individual operating the device. A floppy disk drive FDD which is not shown in the drawings is included in the data transfer device of the present embodiment, as is a handset $2a$ which is essentially the same as those found with conventional telephone devices.

The electrical layout of the present invention will now be described with reference to FIG. 1. As shown in the drawing, a communication signal control unit 1 is provided, by means of which, connections between the data transfer device and external data communication lines can be established or broken, control of the establishment and termination of data links with D and B data channels, and whereby flow control and coordination of incoming and outgoing signals are achieved. Telephone function unit 2 connects with the previously described handset $2a$, and includes such functions as coordination of incoming and outgoing speech communication signals, D/A conversion of incoming speech communication signals, and digitalization of analog signals from the microphone of handset $2a$ in preparation for transmission of speech over the digital communication network.

A floppy disk controller 3, is included whereby operation of data flow to and from floppy disk drive FDD is controlled. Operational unit 4 performs the function of detecting button-press events for any of the previously described buttons K1, K2 ... Ki, Ki+1 ... Kn−1, Kn, number buttons [0] through [9], TELS button [#], star button [*] and start button STK. The operational unit 4 further acts to convey data corresponding to any button-press events which may have been detected to the appropriate components of the data transfer device for further processing. Display unit 5 acts to control the on and off operation of FD ready lamp $L_1$ and data transfer completed lamp $L_2$, as well as the character display functions of LCD $5b$.

Figure 3:
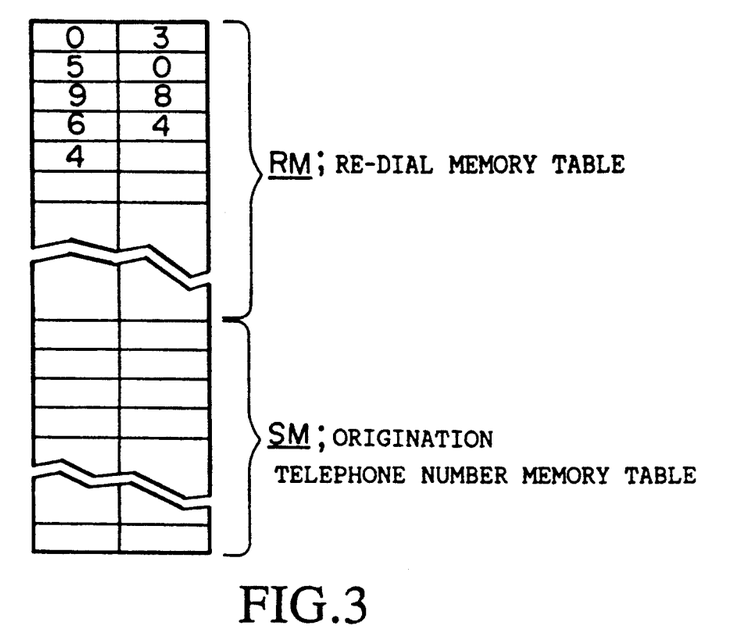
FIG. 3 shows a data structure in RAM for the device shown in FIG. 1, and which includes a re-dial telephone number memory table and an origination telephone number memory table.

Processor 6 is provided so as to control and coordinate the various components and functions of the data transfer device as a whole. Memory for storage of data and control programs is provided internal to processor 6, both in the form of ROM (read only memory) and as RAM (random access memory). As shown In FIG. 3, two predetermined data regions are defined within the RAM, namely, a re-dial memory table RM and an origination telephone number memory table SM. In ordinary operation, the activity of communication signal control unit 1 is monitored by processor 6. When a communication session has been initiated at the local station, the telephone number entered for the remote destination station is stored in the re-dial memory table RM. When a communication session has been initiated at a remote station, the telephone number of the calling remote station is stored in the origination telephone number memory table SM. These operations will be described in greater detail in a following section.

Communication signal control unit 1, telephone function unit 2, floppy disk controller 3, operational unit 4, display unit 5 and processor 6 are interconnected by system bus SB, thereby permitting the exchange of data and various control signals therebetween.

Figure 4:
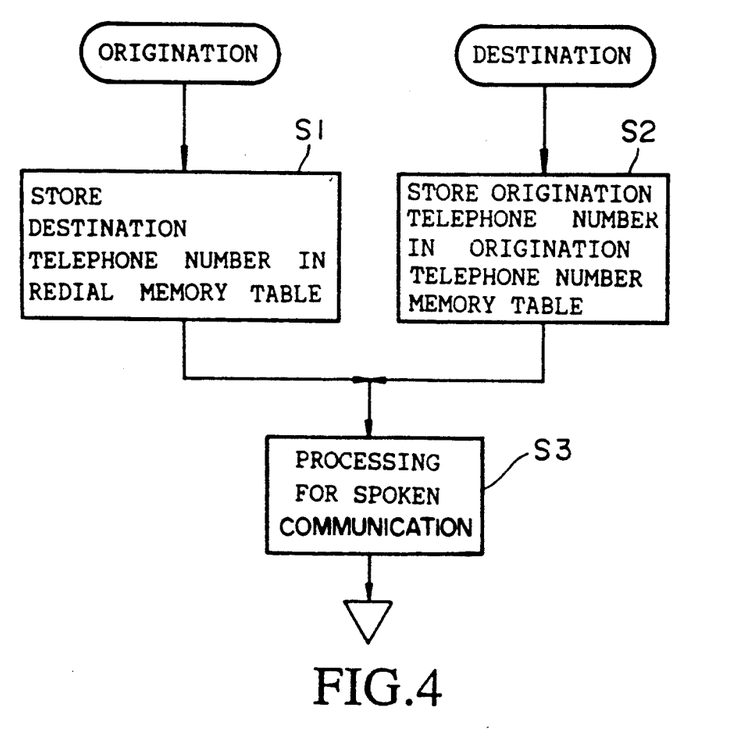
FIGS. 4 through 6 are flow charts illustrating routines executed in the data transfer device shown in FIG. 1.

In the following, with reference to the flow charts of FIGS. 4 through 6, the operation of the data transfer device of the present preferred embodiment will be described.

Local Origination of Data Transfer to Remote Station

When it is desired to originate the transmission of data at the local station to a remote station, the individual operating the device first places a floppy disk FD containing the data to be transmitted into the floppy disk drive FDD. After the floppy disk FD has been properly seated in floppy disk drive FDD, FD ready lamp $L_1$ illuminates. Handset $2a$ is then put in the off-hook state, after which the telephone number of the remote destination is inputted using numerical switch unit DK. When telephone function unit 2 has detected that handset $2a$ is in the off-hook state, and operational unit 4 detects that a complete telephone number has been entered, the remote destination telephone number which has been inputted and is held in processor 6 is then stored in redial memory table RM (FIG. 4, step S1).

Additionally, when communication signal control unit 1 detects that a complete telephone number has been entered, a connection request including the local telephone number and remote destination telephone number is outputted via a DSU (digital services unit) and sent into the ISDN, whereupon a connection is established between the local data transfer device and the ISDN, via the $B_1$ channel for example. The ISDN then responds to the local station by sending data verifying that the connection request has been received, this data been provided to processor 6 via communication signal control unit 1. The ISDN then supplies the above described connection request to the remote station designated by the telephone number inputted at the local station, while at the same time, the ISDN sends information to the local station indicating that the remote station is being called. When the remote station goes into the off-hook state, the remote station goes on-line and sends an on-line response to the local station via the ISDN, whereupon a connection for spoken communication between the local station and the remote station is completed. An ordinary telephone conversation can then be carried out (FIG. 4, step S3 and the triangle therebelow).

After the originator of the transfer at the local station informs the individual at the remote station that data is about to be transferred, and has verified that there is a floppy disk in the remote floppy disk drive capable of receiving the data to be transmitted, the originator presses the start button STK, whereupon the detection of the button-press event for start button STK by operational unit 4 is relayed to processor 6.

Figure 5:
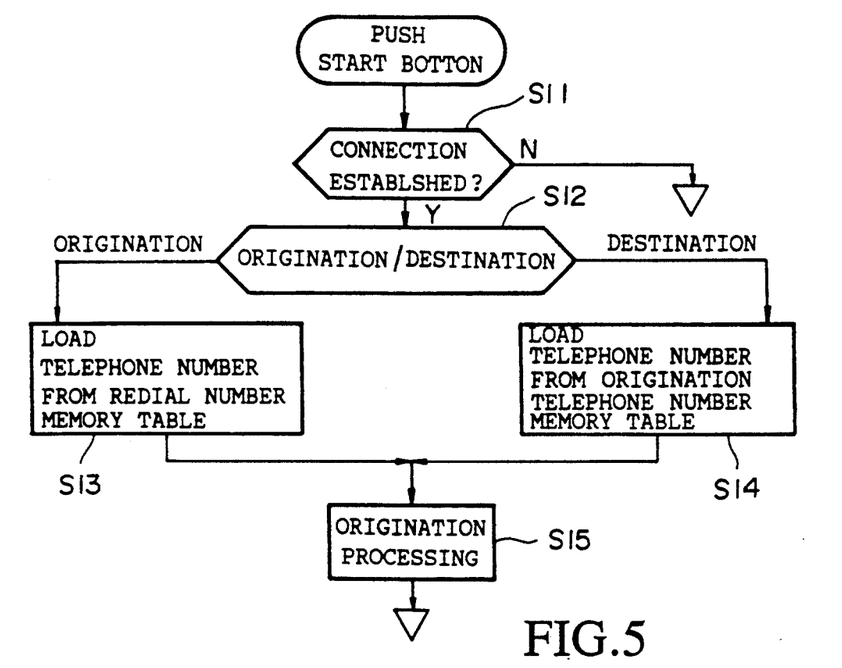
Figure 6:
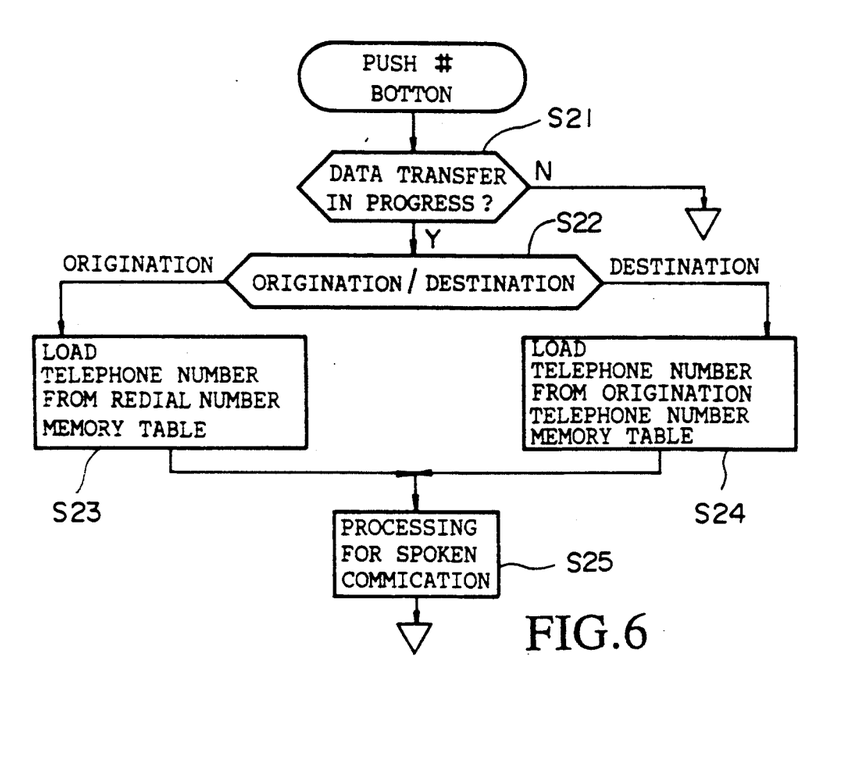

As a result of the above described series of events, processor 6 issues a command to floppy disk controller 3 to cause floppy disk drive FDD to commence a read operation of the floppy disk FD therein, whereupon the routine shown in FIG. 5 is executed, starting with step S11 wherein a judgement is made as to whether or not a connection is established with a remote station. When the result of the judgement in step S11 is [NO], then the routine terminates until a judgement [YES] is indicated, in this way preventing accidental transfer of data into the network when a mutual connection between two stations has not been established. When the result of the judgement in step S11 is [YES], the routine then proceeds to step S12, wherein a judgement is made as to whether the station itself is the originator of the communication session or if the station itself is connected with a remote station wherefrom communication was originated. Since the local station is the originator of communication in the present example, the routine then proceeds to step S13, whereupon the telephone number of the remote station is loaded from the re-dial memory table RM. The routine then proceeds to step S15, wherein communication signal control unit 1 is instructed that a connection request for the remote station having the telephone number which was loaded from re-dial memory table RM in step S13 has been made.

As a result of step S15, just as for establishing a connection between lines for spoken communication as previously described, communication signal control unit 1 issues a communication request to the ISDN, whereupon a connection is established between the local data transfer device and the ISDN via an unused $B_2$ channel. The ISDN then supplies a connection request to the remote station designated by the telephone number inputted at the local station, and sends information to the local station indicating that the remote station is being called. When the remote station responds to the connection request, an on-line response is then sent to the local station via the ISDN, whereupon connection for data transfer between the local station and the remote station is completed, and data transfer is thus possible and proceeds as indicated by the triangle below S15 and as described hereinbelow.

The communication signal control unit 1 then makes a request to the ISDN for the establishment of an ABM (asynchronous balanced mode) data link, and sends an SABM.P (set ABM P bit, i.e., request for response with the P bit set) command to the remote station so as to request a response therefrom. When the remote station is capable of responding in ABM mode, it returns a UA.F command (UA command with the F permission bit set). In this way, a data link is established between the local station and the remote station, thus making it possible to transmit the data stored on the floppy disk FD at the local station over the ISDN to the remote station after constructing an I frame (data frame) in communication signal control unit 1. This procedure for transferring data stored on a floppy disk has been previously disclosed by the present inventors in U.S. patent application Ser. No. 07/686,781, filed Apr. 17, 1991.

With the transfer of data stored on floppy disk FD in progress, the conversation between the local and remote stations can continue if so desired, or if there is no need for further conversation, handset 2a can be put on the hook (hereinafter referred to as on-hook state), whereupon the lines for speech communication will be disconnected. If the operator desires to resume a conversation which has been once terminated, by picking up the handset 2a (hereinafter referred to as off-hook state) and pressing the TELS button [#], the other party will be called and the telephone conversation can then continue. If the TELS button [#] is pushed under these circumstances, execution of the routine shown in FIG. 6 begins, commencing with step S21. In step S21, a judgement is made as to whether data transfer is in progress or not. If the result of this judgement is [NO], no speech link is established, and the routine terminates until a judgement [YES] is indicated.

If the result of the judgement in step S21 is [YES], the routine proceeds to step S22, wherein a judgement is made as to whether the station itself is the originator of the communication session or if the station itself is connected with a remote station wherefrom communication was originated. If the local station is the originator of communication, the routine then proceeds to step S23, whereupon the telephone number of the remote station is loaded from the re-dial memory table RM. The routine then proceeds to step S25, wherein communication signal control unit 1 is instructed that a connection request for the remote station having the telephone number which was loaded from re-dial memory table RM in step S23 has been made. Conversely, if the remote station is the originator of communication, the routine proceeds from step S22 to step S24, whereupon the telephone number of the originating station is loaded from the origination telephone number memory table SM. The routine then proceeds to step S25, wherein communication signal control unit 1 is instructed that a connection request for the station having the telephone number which was loaded from origination telephone number memory table SM in step S24 has been made, and communication can proceed as indicated by the triangle below S25 and as described hereinbelow.

Remote Origination of Data Transfer to Local Station

When communication signal control unit 1 receives a connection request including the telephone number of the remote station from the ISDN, it sends a call-out command to a call circuit (not shown), whereupon an audible bell tone is generated at the local data transfer device. When the local operator then takes handset 2a off-hook, the bell tone stops and communication signal control unit 1 sends an on-line response to the ISDN, whereupon connection for spoken communication between the local station and the remote station is completed. The telephone number of the remote originating station which has been written in processor 6 by communication signal control unit 1 is then stored in origination telephone number memory table SM (FIG. 4, step S2). At this point, an ordinary telephone conversation between the local and remote stations can be carried out (FIG. 4, step S3).

After the originator of the transfer at the remote station informs the individual at the local station that data is ready to be transferred, and a floppy disk FD capable of receiving the data to be transmitted has been placed in the local floppy disk drive FDD, the individual operating the local destination station presses the start button STK, whereupon the detection of the button-press event for start button STK by operational unit 4 is relayed to processor 6.

As a result of the above described series of events, the routine shown in FIG. 5 is executed starting with step S11, wherein a judgement is made as to whether or not a connection is established with a remote station. Because a link has already been established, the result of the judgement in step S11 is [YES], and the routine then proceeds to step S12, wherein a judgement is made as to whether the station itself is the originator of the communication session or if the station itself is connected with a remote station wherefrom communication was originated. Since the remote station is the originator of communication in the present example, the routine then proceeds to step S14, whereupon the telephone number of the remote station is loaded from the origination telephone number memory table SM. The routine then proceeds to step S15, wherein communication signal control unit 1 is instructed that a connection request for the remote originating station whose telephone number was loaded from re-dial memory table RM in step S14 has been made, and communication can proceed as indicated by the triangle below S15 and as described hereinbelow.

As a result of step S15, communication signal control unit 1 issues a communication request to the ISDN, whereupon a connection is established between the local data transfer device and the ISDN via an unused $B_2$ channel. The ISDN then calls the remote originating station, after which the remote station responds by sending an on-line response to the local station via the ISDN, whereupon connection for data transfer between the local station and the remote station is completed, and data transfer from the floppy disk at the remote station to that of the local station is carried out in a manner analogous to that described previously.

Although this first preferred embodiment has been described in terms of an ISDN, this embodiment is equally applicable to other types of suitable digital networks, although simultaneous transmission of speech and data is not generally possible with other digital networks presently available. Thus, when employed on a digital network other than an ISDN, when the start button STK is pressed, spoken communication is ordinarily terminated, and is then follow by transfer of data as described above.

Figure 7:
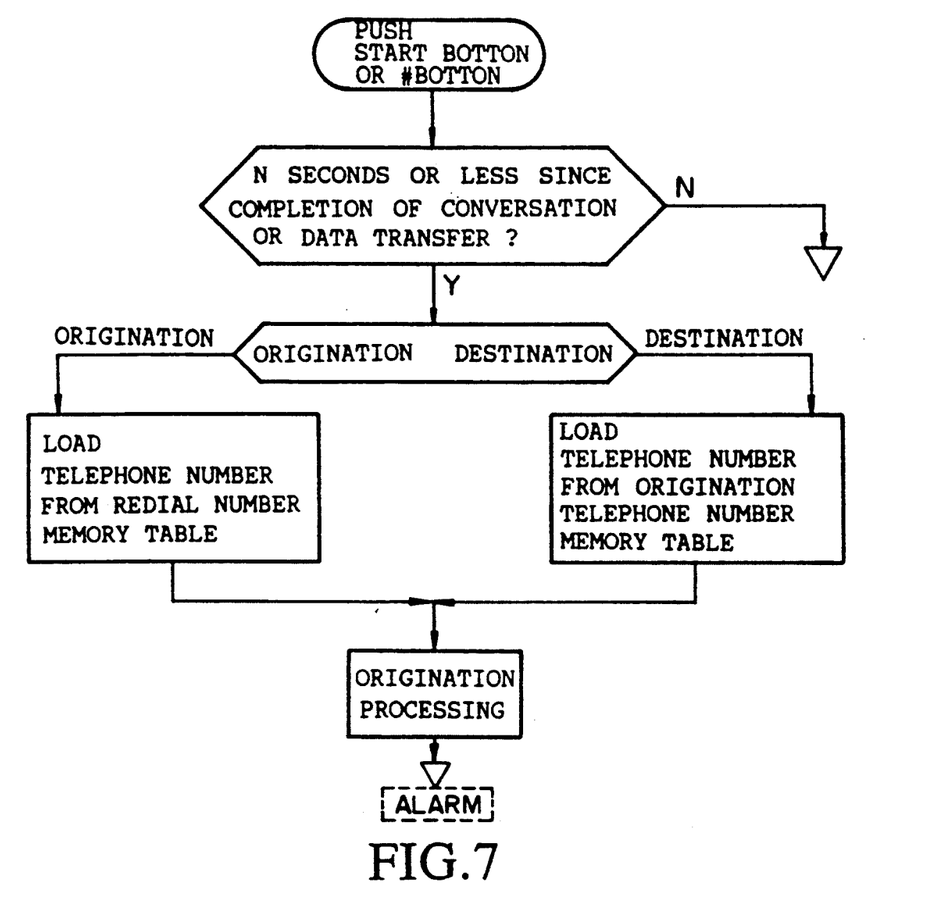
FIG. 7 is a flow chart illustrating a routine executed in a data transfer device of a second preferred embodiment of the present invention.

In FIG. 7, a second preferred embodiment of the present invention is shown, wherein following completion of communication and disconnection between a local and remote station, during a time interval thereafter designated by the operator, an interval of n seconds for example, a connection can be readily established with the other station by merely pushing the start button STK or TELS button [#]. In this device when operation of start button STK or TELS button [#] has been detected by operational unit 4, the routine shown in FIG. 7 is executed. Upon entry into the routine of FIG. 7, first of all, a judgement is made as to whether n seconds or less has passed since completion of conversation or data transfer. If the answer to this judgement is [NO], the routine terminates until a judgement [YES] is indicated, whereas when the answer is [YES], the routine proceeds to the next step wherein a judgement is made as to whether the station itself was the originator of the previous communication session, or if the station itself was the destination of the previous communication session. If the local station was the originator of communication, then the telephone number of the remote station is loaded from the re-dial memory table RM. Conversely, if the local station was the destination of the previous communication, then the telephone number of the remote station is loaded from the origination telephone number memory table SM. After the appropriate number has been thus loaded from the re-dial memory table RM or origination telephone number memory table SM, then a data link is established, as indicated by the triangle at the bottom of FIG. 7, in a method identical to that described in the first preferred embodiment.

In the above described second preferred embodiment, it is possible to implement a default time interval, for example one minute, such that when the user does not designate a call back interval, one minute after complete of data transfer is assumed. Thus, when the data transfer completes, a chime can be made to sound, as indicated by the dashed block in FIG. 7, reminding the user that he/she has one minute within which it is possible to easily connect with the previous remote party by simply pushing the start button STK or TELS button [#]. Alternately, this device can be designed such that after the chime sounds, the user has one minute within which it is possible to replace the first floppy disk with a second one, and then easily resume transfer of data to the previous remote party by simply pushing the start button STK, thereby considerably facilitating transfer of data on multiple floppy disks.

What is claimed is:

1. A data transfer device for transmitting and receiving speech and data over digital communication lines, said data transfer device comprising:
   a) first telephone number memory means for storing a telephone number of a remote communication node with which said data transfer device originates a communication session;
   b) second telephone number memory means for storing a telephone number of a remote communication node which originates a communication session with said data transfer device;
   c) start command generating means for generating a start command; and
   d) data transfer means for transferring data, such that:
      i) when said start command generating means generates a start command and a time interval of no greater than a predetermined time interval has a elapsed since completion of a communication session which was originated by said data transfer device, said data transfer means initiates a connection over a channel for transmission of digital data between said data transfer device and the remote communication node corresponding to the telephone number stored in said first telephone number memory means, and
      ii) when said start command generating means generates a start command and a time interval of no greater than a predetermined time interval has elapsed since completion of a communication session which was originated by a remote communication node, said data transfer means initiates a connection over a channel for transmission of digital data between said data transfer device and the remote communication node corresponding to the telephone number stored in said second telephone number memory means.

2. A data transfer device in accordance with claim 1, said data transfer device further comprising:
   a) conversation command generating means for generating a conversation command; and
   b) conversation function control means for controlling a conversation function, wherein:
      i) when said conversation command generating means generates a conversation command and said data transfer device has originated a communication session, said conversation function control means initiates a connection over a channel for transmission of spoken conversation between said data transfer device and the remote communication node corresponding to the telephone number stored in said first telephone number memory means, and
      ii) when said conversation command generating means generates a conversation command and a remote communication node has originated a communication session, said conversation function control means initiates a connection over a channel for transmission of spoken conversation between said data transfer device and the remote communication node corresponding to the telephone number stored in said second telephone number memory means.

* * * * *

UNITED STATES PATENT AND TRADEMARK OFFICE
CERTIFICATE OF CORRECTION

PATENT NO. : 5,315,640
DATED : May 24, 1994
INVENTOR(S) : Akira Takayama, et al.

It is certified that error appears in the above-indentified patent and that said Letters Patent is hereby corrected as shown below:

On the Title page, item [57] col. 2,
In the Abstract, line 24: "Initiates" should read --initiates--

Column 3, line 48: "In" should read --in--

Column 8, line 23, Claim 1: after "has" delete --a--

Signed and Sealed this

Eleventh Day of October, 1994

Attest:

BRUCE LEHMAN

Attesting Officer     Commissioner of Patents and Trademarks